(12) United States Patent
Dayan et al.

(10) Patent No.: US 6,772,264 B1
(45) Date of Patent: Aug. 3, 2004

(54) ENABLING A DOCKING STATION FOR ISA ADAPTERS

(75) Inventors: Richard Alan Dayan, Wake Forest, NC (US); David Carroll Challener, Raleigh, NC (US); John Mason Elmore, Wake Forest, NC (US); Richard Allen Kelley, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/575,592

(22) Filed: May 22, 2000

(51) Int. Cl.[7] .............................................. G06F 13/00
(52) U.S. Cl. ...................................... 710/303; 710/315
(58) Field of Search ................................ 710/300, 303, 710/309, 312, 260, 261, 2, 48, 62, 65, 304–306, 311, 315; 361/686

(56) References Cited

U.S. PATENT DOCUMENTS

| | | | | |
|---|---|---|---|---|
| 5,752,043 A | * | 5/1998 | Suzuki | 710/261 |
| 5,884,049 A | * | 3/1999 | Atkinson | 710/303 |
| 5,948,074 A | * | 9/1999 | Ninomiya | 710/2 |
| 6,044,215 A | * | 3/2000 | Charles et al. | 703/25 |
| 6,256,691 B1 | * | 7/2001 | Moroz et al. | 710/303 |

* cited by examiner

Primary Examiner—Xuan M. Thai
(74) Attorney, Agent, or Firm—Carlos Munoz-Bustamante Dillon & Yudell, LLP (57) ABSTRACT

A docking station system for use with a computer system which includes an externally accessible PC Card interface for transferring signals conforming to the PC Card standard to a docking station enclosure. The docking station enclosure includes a PC Card connector that connects to and passes interface signals between the PC Card interface of the computer system and the docking station enclosure. The docking station enclosure further includes an ISA bus structure conforming to the ISA bus standard. Additionally, the docking station enclosure incorporates conversion logic which is connected to receive signals from the computer system via the PC Card connector, and converts these received signals to signals for operating the ISA bus structure. The computer system includes conversion logic which is connected to receive signals from the docking station enclosure via the PC Card connector, and to convert these signals to system interrupt requests. In this manner, one or more ISA adapters can be utilized in the docking station enclosure to emulate one or more PC Card functions at the PC Card interface.

14 Claims, 13 Drawing Sheets

ENABLING A DOCKING STATION FOR ISA ADAPTERS

BACKGROUND OF THE INVENTION

1. Technical Field

The present invention relates in general to improved docking stations. In particular, the present invention relates to improved docking stations for a personal computer. Still more particularly, the present invention relates to improved docking station for mobile personal computers utilizing a PC Card interface.

2. Description of the Related Art

Though popular, portable computers, such as notebook, laptop or palmtop computers have several shortcomings when compared to conventional desktop computers. They typically include a keyboard that is smaller and more difficult to use than a conventional keyboard, and a smaller, lower resolution screen than a conventional desktop monitor. In addition, portable computers rarely include such peripherals as CD ROMS, tape backups, secondary hard drives, modems, and network connectors.

A portable computer user seeking these features has limited options. The user can purchase separate portable and desk top computers. However, given that the user can only use one computer at a time, this option is costly and requires frequent data transfers between the two computers. A second option is to plug the various peripherals into their designated ports on the portable computer. Unfortunately, most portable computers do not connectors for many of the peripherals desired. Moreover, separately connecting and unconnecting the various peripherals is time consuming and burdensome.

A third option for the portable computer user seeking to expand the capabilities of their portable computer is to purchase a docking station or expansion base into which the particular portable computer may easily be docked during desktop use. Thus, only one computer is necessary, and data transfer is not required. The docking station typically sits on the user's desk and provides connections to various peripheral devices, such as full-size keyboards and monitors, modems, network connectors, etc. Once the portable computer is docked in the docking station, the portable computer has access to all of the various peripherals attached to the docking station. When travel is necessary, the user can simply remove the portable computer from the docking station and carry it with him on the road.

A major shortcoming of current docking stations is their reliance on proprietary connectors to connect the portable computer to the docking station. Consequently, one must purchase the docking station that corresponds to the make and model of the portable computer they currently own, and is most likely precluded from using docking stations manufactured by different companies. This severely limits the usefulness of the docking station concept because a portable computer user is confined to a small number of stations into which he can dock his computer. A strong need exists for a docking station system that provides the added advantages and capabilities of a desktop computer, particularly the ability to utilize both PCI and ISA devices, but does not require a proprietary connection to the portable computer.

Accordingly, as is apparent from the foregoing description, it would be desirable to provide an improved docking station system that would be compatible with computer systems utilizing a PC Card Interface and that would support both PCI and ISA devices.

SUMMARY OF THE INVENTION

It is therefore one object of the present invention to provide an improved docking station.

It is another object of the present invention to provide an improved docking station for a personal computer.

It is yet another object of the present invention to provide an improved docking station for mobile personal computers which utilize a PC Card interface.

It is still another object of the present invention to provide an improved docking station that supports ISA adapters for mobile personal computers which utilize a PC Card interface.

The foregoing objects are achieved as is now described. A docking station system is provided for use with a computer system which includes an externally accessible PC Card interface for transferring signals conforming to the PC Card standard to a docking station enclosure. The docking station enclosure includes a PC Card connector that connects to and passes interface signals between the PC Card interface of the computer system and the docking station enclosure. The docking station enclosure further includes an ISA bus structure conforming to the ISA bus standard. Additionally, the docking station enclosure incorporates bridge logic which is connected to receive signals from the computer system via the PC Card connector, and converts these received signals to signals for operating the ISA bus structure. The computer system also includes conversion logic which is connected to receive signals from the docking station enclosure via the PC Card connector, and to convert these signals to system interrupt requests for use within the computer system. In this manner, one or more ISA adapters can be utilized in the docking station enclosure to emulate one or more PC Card functions at the PC Card interface.

The above as well as additional objects, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
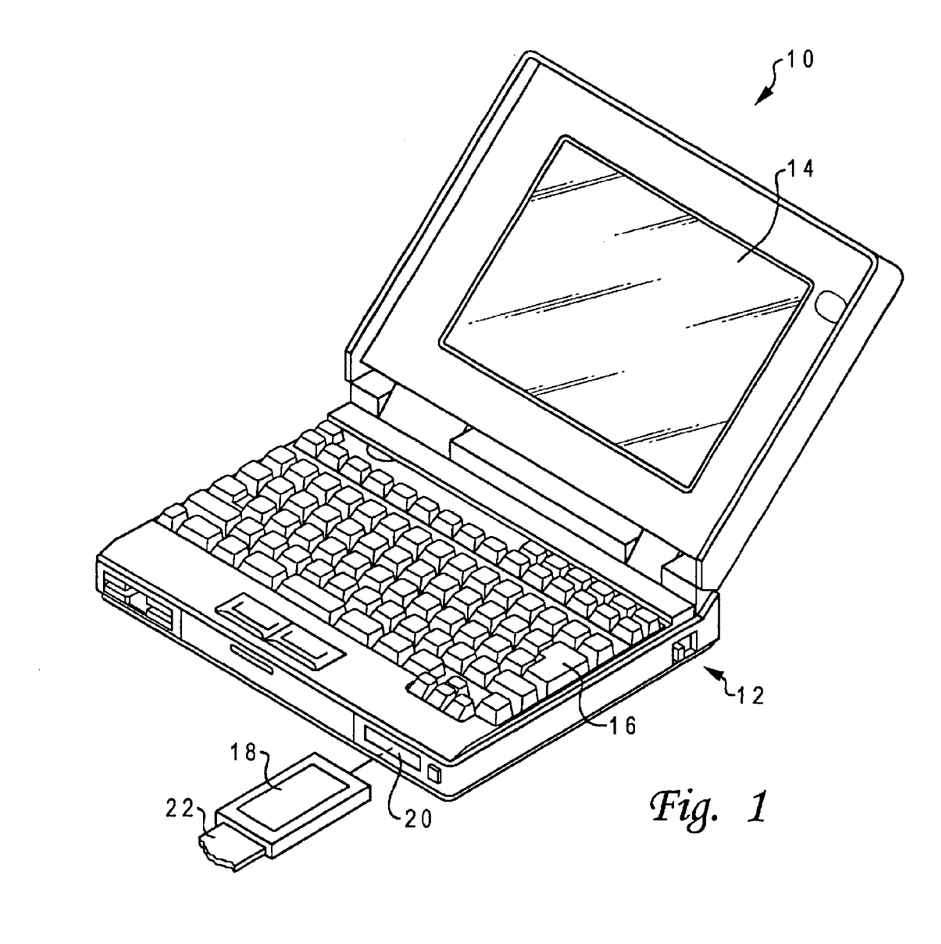
FIG. 1 illustrates a pictorial representation of a computer system which may be utilized to implement a preferred embodiment of the present invention.

With reference now to the figures and in particular with reference to FIG. 1. There is illustrated a pictorial representation of a computer system 10 which may be utilized to implement a preferred embodiment of the present invention. A computer system 10 is depicted that includes a system unit 12, a video display 14, a keyboard 16, and a PC Card interface 20 that is adapted to receive a PC Card 18 having a PC Card signal cable 22. Keyboard 16 is that part of computer system 10 that resembles a typewriter keyboard and which enables a user to control particular aspects of the computer. Because information flows in one direction, from keyboard 16 to system unit 12, keyboard 16 functions as an input-only device. Functionally, keyboard 16 represents half of a complete input/output device, the output half being video display 14. Keyboard 16 includes a standard set of printable characters presented in a QWERTY pattern typical of most typewriters. In addition, keyboard 16 often includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display 14.

PC Card interface 20 is an opening in the housing of computer system 10, designed to hold a PC Card 18. "PC Card" is a trademark of the Personal Computer Memory Card International Association (PCMCIA) that is used to describe add-in cards that conform to the PCMCIA specification. A PC Card 18 is a removable device, approximately the same size as a credit card, that is designed to plug into PC Card interface 20. Release 1 of the PCMCIA specification, introduced in June 1990, specified a Type I card that is 3.3 millimeters thick and is intended to be used primarily as a memory-related peripheral. Release 2 of the PCMCIA specification, introduced in September 1991, specifies both a 5-millimeter-thick Type II card and a 10.5-millimeter-thick Type III card. Type II cards accommodate devices such as modem, fax, and network cards. Type III cards accommodate devices that require more space, such as wireless communications devices and rotating storage media (such as hard disks).

Computer system 10 can be implemented utilizing any suitable computer such as the IBM ThinkpadÔ computer system, a product of International Business Machines Corporation, located in Armonk, N.Y. However, those skilled in the art will appreciate that a preferred embodiment of the present invention can apply to any computer system, regardless of whether the computer is a complicated multi-user computing apparatus, a single user workstation, a laptop, a palmtop, or another portable computer.

Figure 2:
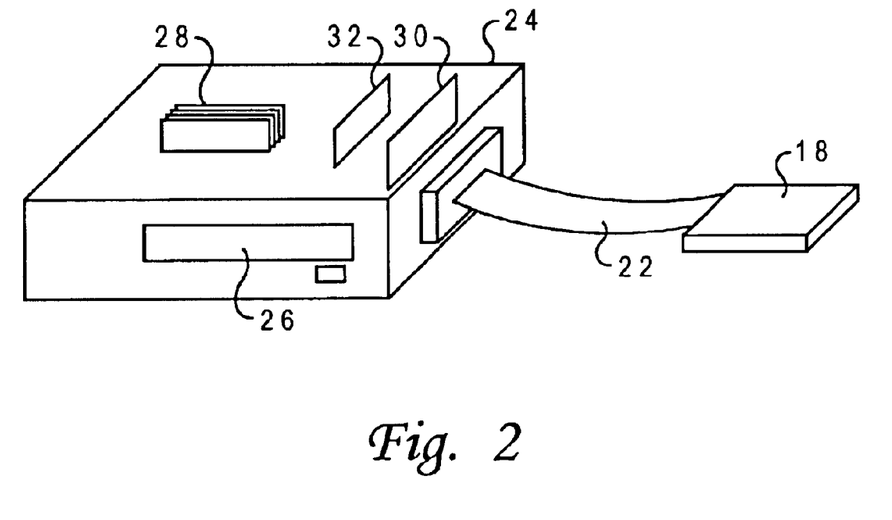
FIG. 2 depicts a pictorial representation of a docking station which may by utilized to implement a preferred embodiment of the present invention.

Referring now to FIG. 2, there is depicted a docking station enclosure 24 which may be utilized to implement a preferred embodiment of the present invention. A docking station enclosure 24 coupled to PC Card 18 by PC Card signal cable 22 for expansion of a system such as computer system 10, is illustrated that may include for example, a compact disk storage device 26 (CDROM), a hard disk drive storage device 28, one or more Industry Standard Architecture (ISA) devices 30 such as a modem, or a Peripheral Component Interconnect (PCI) device 32 such as a Small Computer System Interface (SCSI) controller.

ISA is a bus design specification that allows components to be added as cards plugged into standard expansion slots in IBM Personal Computers and compatibles. ISA was originally introduced in the IBM PC with an 8-bit data path, ISA was expanded in 1984, when IBM introduced the PC/AT, to permit a 16-bit data path.

PCI, a specification introduced by Intel Corporation, defines a local bus system that allows PCI-compliant expansion cards to be installed in the computer. A PCI local bus system requires the presence of a PCI host bridge. The PCI controller can exchange data with the system's CPU either 32 bits or 64 bits at a time, depending on the implementation, and the PCI host bridge allows intelligent, PCI-compliant adapters to perform tasks concurrently with the CPU using a technique called bus mastering.

SCSI is a standard high-speed parallel interface defined by the X3T9.2 committee of the American National Standards Institute (ANSI). A SCSI controller is used to connect microcomputers to SCSI peripheral devices, such as many hard disks and printers and to other computers and local area networks. SCSI is also known by those skilled in the art as SCSI-1. SCSI-2 is an enhanced ANSI standard for SCSI buses. Other versions of SCSI include Fast SCSI, Wide SCSI, and Ultra SCSI.

Figure 3:
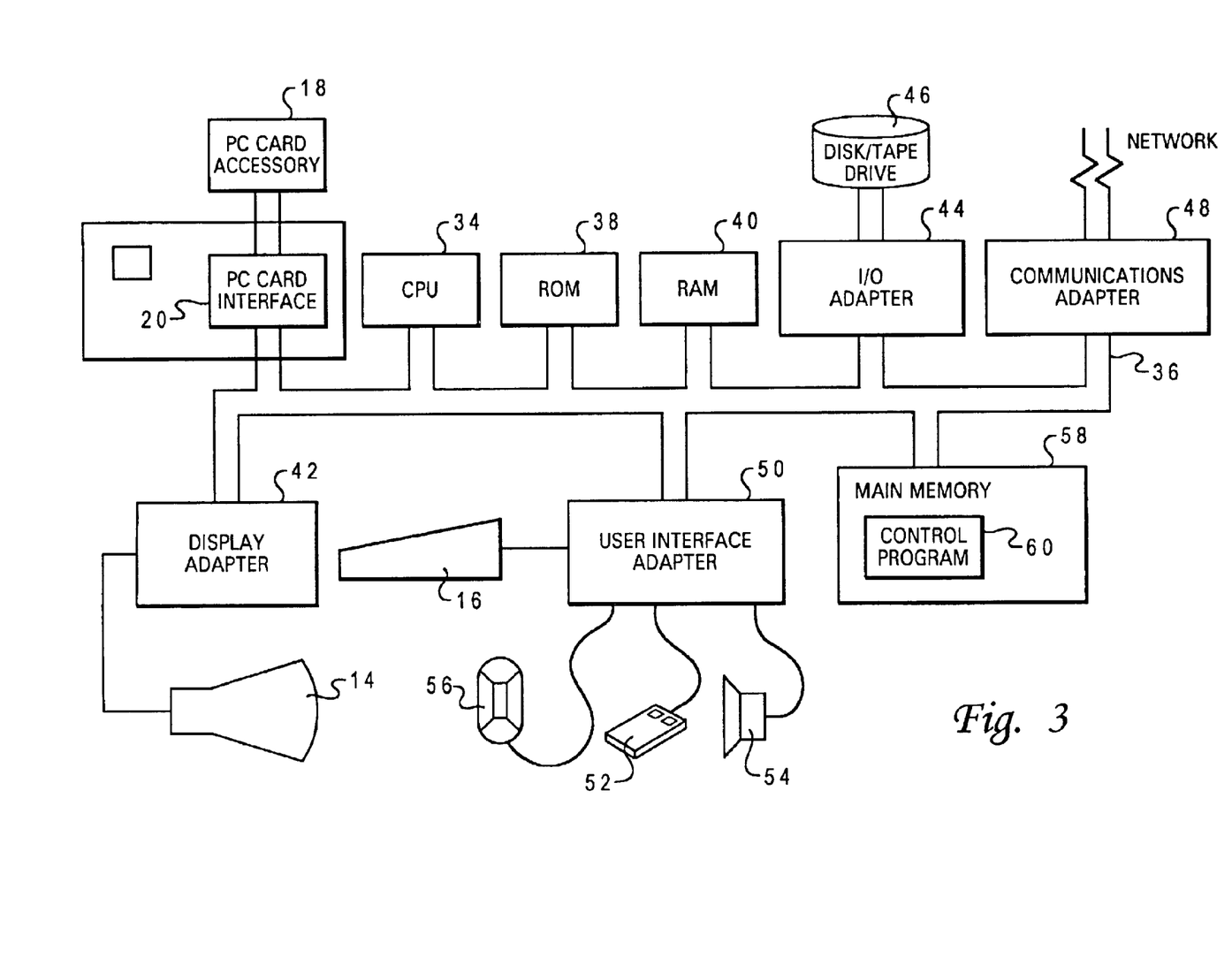
FIG. 3 illustrates a representative hardware environment of the computer system illustrated in FIG. 1.

With reference now to FIG. 3, there is illustrated a representative hardware environment of the computer system illustrated in FIG. 1. Computer system 10 includes a Central Processing Unit (CPU) 34, such as a conventional microprocessor, and a number of other units interconnected via a system bus 36. CPU 34 includes a portion of computer system 10 that controls the operation of the entire computer system, including the arithmetical and logical functions contain in a particular computer program. Although not depicted in FIG. 3, CPU's such as CPU 34 typically include a control unit that organizes data and program storage in a computer memory and transfers the data and other information between the various parts of the computer system. Such CPUs also generally include an arithmetic unit that executes that arithmetical and logical operations, such as addition, comparison, multiplications and so forth. Such components and units of computer system 10 can be implemented in a system unit such as system unit 12 of FIG. 1.

Computer system 10 further includes read-only memory (ROM) 38, random-access memory (RAM) 40, display adapter 42, and Input-Output (I/O) adapter 44 for connecting peripheral devices (e.g., disk and tape drives 46) to system bus 36. ROM 38 is a type of memory that retains information permanently and in which the stored information cannot be altered by a program or normal operation of a computer. RAM 40 is a type of memory designed such that the location of data stored in it is independent of the content. Also, any location in RAM 40 can be accessed directly without having to work through from the beginning.

Video display 14 is the visual output of computer system 10. Video display 14 can be a cathode-ray tube (CRT) based video display well-known in the art of computer hardware. However, with a portable or notebook-based computer, video display 14 can be replaced with a liquid crystal display (LCD) based or gas plasma-based flat-panel display. Computer system 10 further includes user interface adapter 50 for connecting keyboard 16, mouse 52, speaker 54, microphone 56, and/or other user interface devices, such as a touchscreen device (not shown), to system bus 36. Communications adapter 48 connects computer system 10 to a computer network. PC Card interface 20 connects computer system 10 to PC Card accessory 18. Although computer system 10 is shown to contain only a single CPU and a single system bus, it should be understood that the present invention applies equally to computer systems that have multiple CPUs and to computer systems that have multiple buses that each perform different functions in different ways.

Computer system 10 also includes an interface that resides within a machine-readable media to direct the operation of computer system 10. Any suitable machine-readable media may retain the interface, such as, ROM 38 RAM 40, a magnetic diskette, magnetic tape, or optical disk (the last three being located in disk and tape drives 46). Any suitable operating system and associated interface (e.g., Microsoft Windows) may direct CPU 34. For example, the AIX operating system and AIX windows windowing system can direct CPU 34. The AIX operating system is IBM's implementation of the UNIX™ operating system. "UNIX" is a trademark of UNIX Systems Laboratories, Inc. Other technologies also can be utilized in conjunction with CPU 34, such as touch-screen technology or human voice control. Operating systems typically include computer software for controlling the allocation and usage of hardware resources such as memory, CPU time, disk space, and peripheral devices. The operating system is the foundation upon which applications, such as word-processing, spreadsheet, and web browser programs are built.

Those skilled in the art will appreciate that the hardware depicted in FIG. 3 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted.

Figure 4:
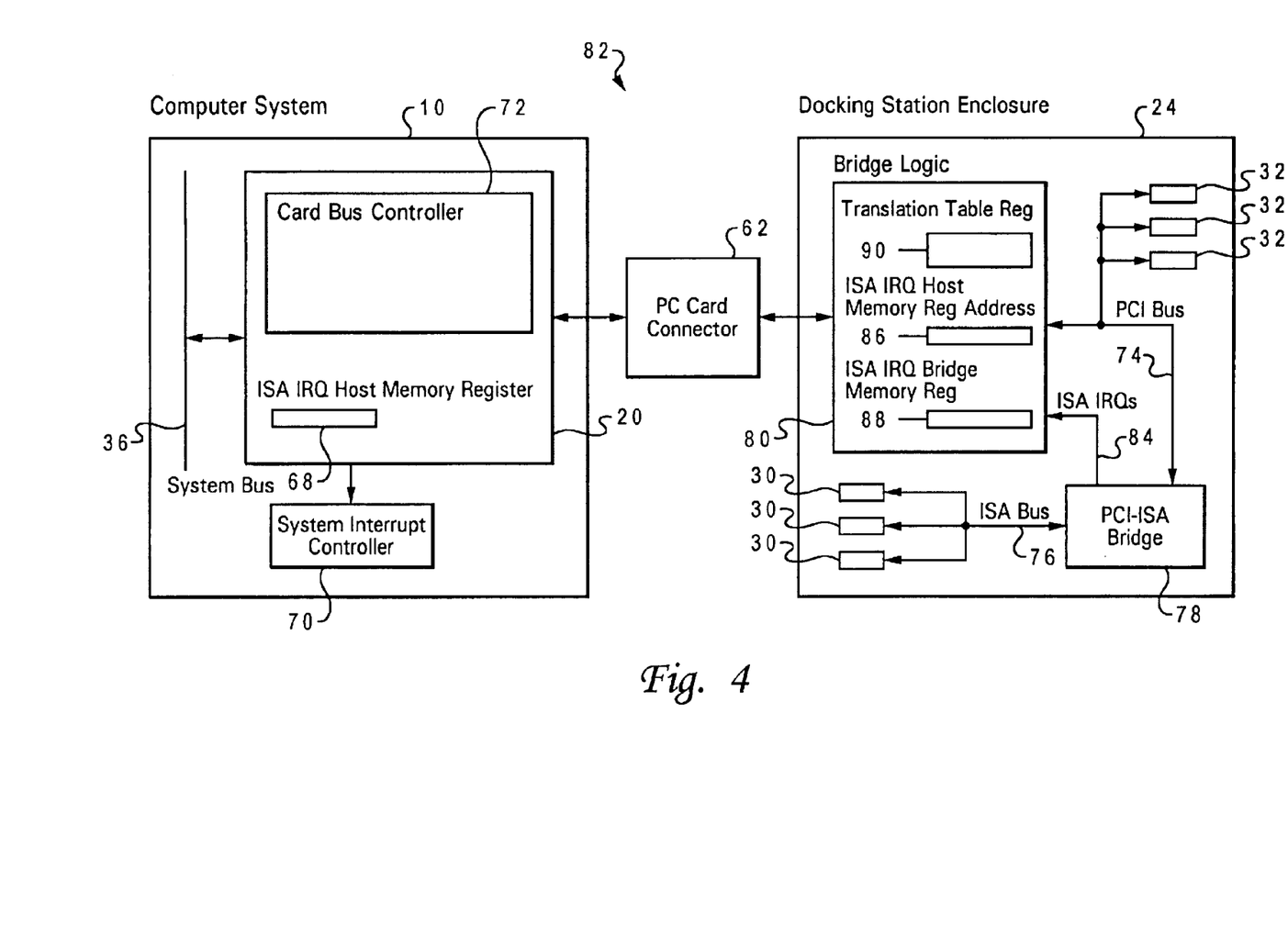
FIG. 4 depicts a representative hardware environment of the docking station system which may be utilized to implement a preferred embodiment of the present invention.

Referring now to FIG. 4, there is depicted docking station system 82, according to the present invention, consisting of computer system 10, docking station enclosure 24, and PC card connector 62.

Computer system 10 includes PC card interface 20, system bus 36, and system interrupt controller 70. PC card interface 20 includes CardBus controller 72, and ISA IRQ Host Memory Register 68. ISA IRQ Host Memory Register 68 is a dual port memory storage device such as RAM or an I/O register for storing system interrupt requests. System interrupt controller 70 is a standard interrupt controller of computer system 10 which is utilized to signal the CPU that a device is requesting attention. The system interrupt controller 70 is well known in the art of computer hardware.

PC card connector 62 plugs into PC card interface 20 and is for coupling docking station enclosure 24 to computer system 10. PC card connector 62 conforms to the PCMCIA PC Card Bus standard. As new PCMCIA standards are developed, PC card connector 62 can be adapted to meet the new specifications. Communications between computer system 10 and docking station 24 occur via PC card connector 62 and utilize the PCMCIA PC Card Bus Standard interface which is well known in the art of computer hardware.

Docking station enclosure 24 includes bridge logic 80, multiple PCI devices 32 connected to PCI bus 74, multiple ISA devices 30 connected to ISA bus 76, and PCI-ISA bridge 78. Bridge logic 80 includes ISA IRQ Host Memory Address Register 86, ISA IRQ Bridge Memory Register 88, and translation table register 90.

PCI bus 74 is a bus system utilizing the PCI bus protocol specification, and ISA bus 76 is a bus system utilizing the ISA bus protocol specification. PCI-ISA bridge 78 is coupled to ISA bus 76, PCI bus 74, and bridge logic 80. PCI-ISA bridge 78, PCI bus 74 and ISA bus 76 are well known devices in the art of computer hardware and are commonly available on computer systems.

Bridge logic 80 is a custom bridge for coupling PCI devices 32 including PCI-ISA bridge 78 to PC card interface 20. Bridge logic 80 performs three distinct functions. First, as described by prior art, bridge logic 80 configures devices connected to PCI bus 74. Second, as also described by prior art, bridge logic 80 monitors the communication signals transmitted between docking station enclosure 24 and computer system 10 via PC card connector 62 and converts all configuration reads and writes to correspond to the appropriate device identifiers on the PC Card and PCI sides of bridge logic 80, respectively. And third, monitors ISA IRQ signal line 84 for interrupt requests from PCI-ISA bridge 78 and writes the data to ISA IRQ Host Memory Register 68. Standard bus logic (not shown) detects changes in ISA TRQ Host Memory Register 68, and directs system interrupt controller 70 to issue a system interrupt request. In this manner, interrupt requests made by ISA devices 30 are communicated to system interrupt controller 70.

The bridge logic 80 may be implemented in a hardware Application Specific Integrated Circuit (ASIC) or by programmed logic executed on a general purpose processor (not shown) as is well known. Such logic is described below in terms of logic defining flow charts suitable to enable those skilled in the art to implement either form of signal processing logic.

The present invention provides support for allowing computer system 10 to access multiple ISA devices 30 located in docking station enclosure 24, wherein docking station enclosure 24 and computer system 10 communicate via PC Card Connector 62. Providing support for allowing computer system 10 to access multiple PCI devices 32 located in docking station enclosure 24 has been described in prior art.

Translating communications signals between ISA device 30 and system bus 36 is accomplished by utilizing PCI-ISA bridge 78 to couple ISA bus 76 to PCI bus 74. As described in prior art, bridge logic 80 translates communications signals between PCI bus 74 and system bus 36 via PC Card connector 62. PCI bus 74 is a bus system utilizing the PCI bus protocol specification, and ISA bus 76 is a bus system utilizing the ISA bus protocol specification. The PCI-ISA bridge, PCI bus and ISA bus structures are well known in the art of computer hardware and are commonly available on computer systems. Translating communication signals between PCI bus 74 and system bus 36 has been described in prior art.

Figure 5:
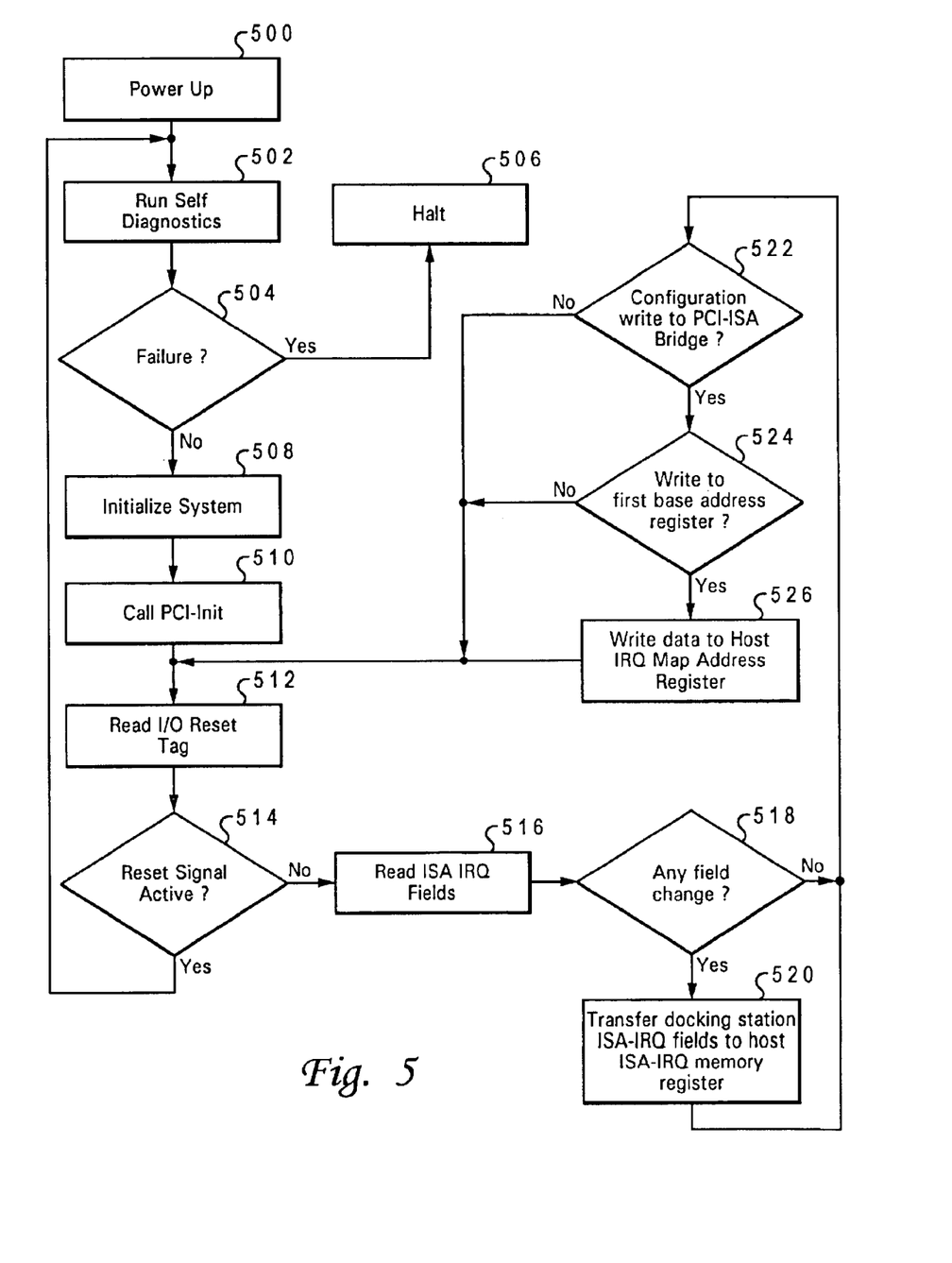
FIGS. 5, 6, 7a, 7b, 8a, 8b, 9–10 illustrate high-level logic flow diagrams indicating bridge logic, according to a preferred embodiment of the present invention.

With reference now to FIG. 5, there is illustrated a high-level logic flow diagram that depicts the power up and configuration process of the docking station enclosure 24, according to a preferred embodiment of the present invention. As illustrated at step 500, the powerup process is started and the system runs its self diagnostics as shown at step 502. At step 502, a test is made to determine if the docking station enclosure self test completed successfully. If all tests were completed successfully, the system is initialized at step 508 and then the channel initialization routine is invoked as illustrated at step 510. If the self test did not complete properly, the routine halts as shown at step 506.

Once initialized, the system reads I/O reset register at step 512. The reset register is utilized to indicate that computer system 10 wants to perform a reset function in the docking station enclosure 24. As depicted at step 514, the reset register is tested. If the reset register is active, then the process continues as shown at step 502. If the reset register is not active, then the process continues to step 516.

Figure 6:
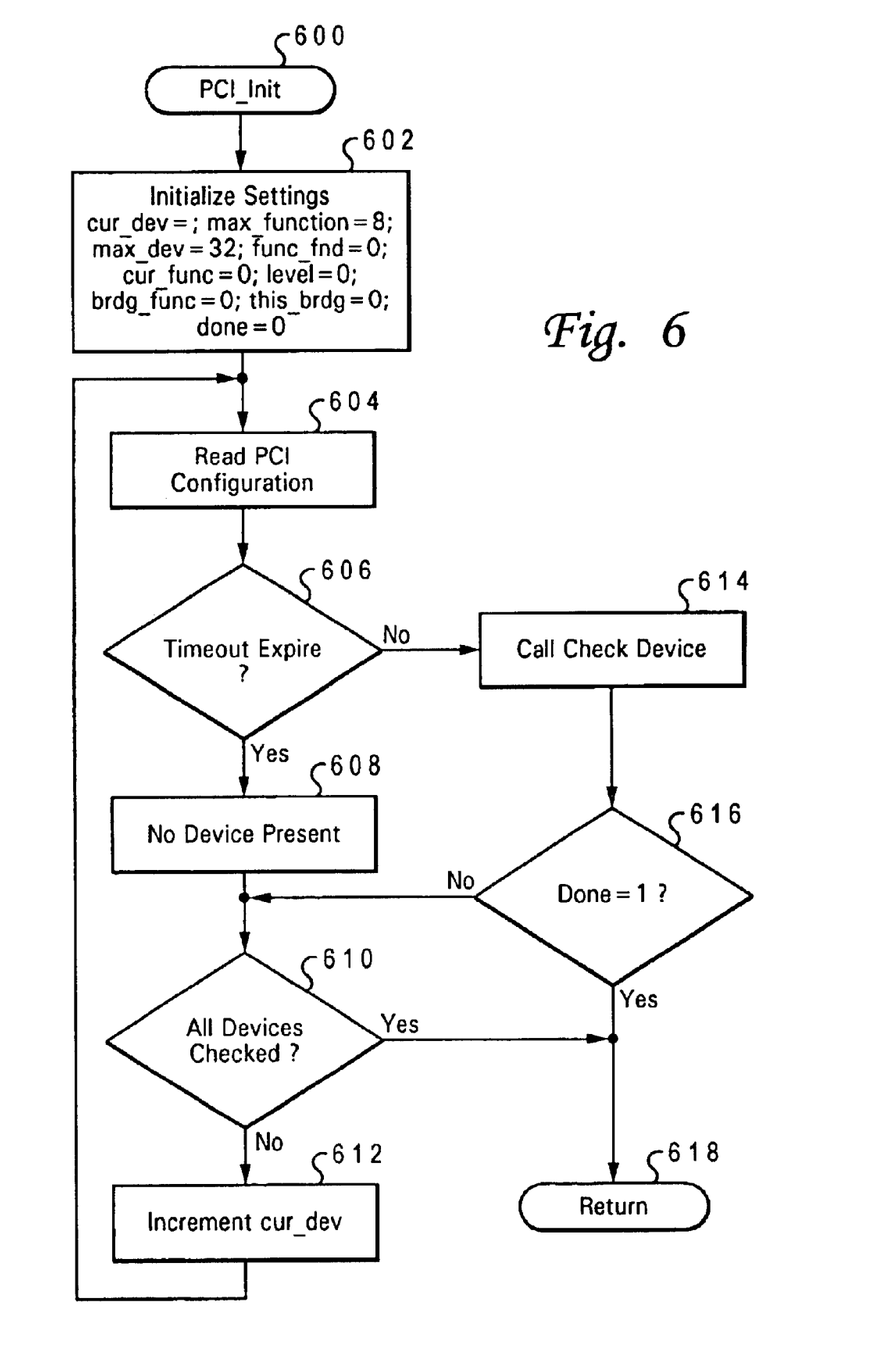

With reference now to FIG. 6, there is illustrated a high-level logic flow diagram that illustrates the PCI_Init routine of the docking station enclosure 24, according to a preferred embodiment of the present invention. The PCI_Init routine is initiated at step 510. As illustrated at step 602, several parameters are initialized which are utilized to determine if any devices are present in PCI bus 74. In step 604, the configuration space is read utilizing the current values of the initialized parameters. Next, in step 606, it is determined whether or not a read timeout has occurred while checking for a device in the PCI bus 74. If a read timeout did occur, then as shown at step 608, no device is present in the channel tested. Next, at step 610, it is determined if all potential devices have been accessed to check for devices. If not, then the current device counter (cur_dev) is incremented as shown at step 612, and the process restarts at step 604.

Referring back to step 506, if no read timeout occurred, then the Check Device routine is called as depicted at step 614. Following the Check Device routine, the initialization code is checked in step 616 to see if all devices have been found or the maximum number of functions allowed have been detected as indicated by done=1. If done=1 indicating that all devices have been checked or the maximum device limit has been reached, then the routine returns to the calling routine as indicated at step 618. If done<>1, then the initialization routine continues its execution as illustrated in step 610.

Figure 7A:
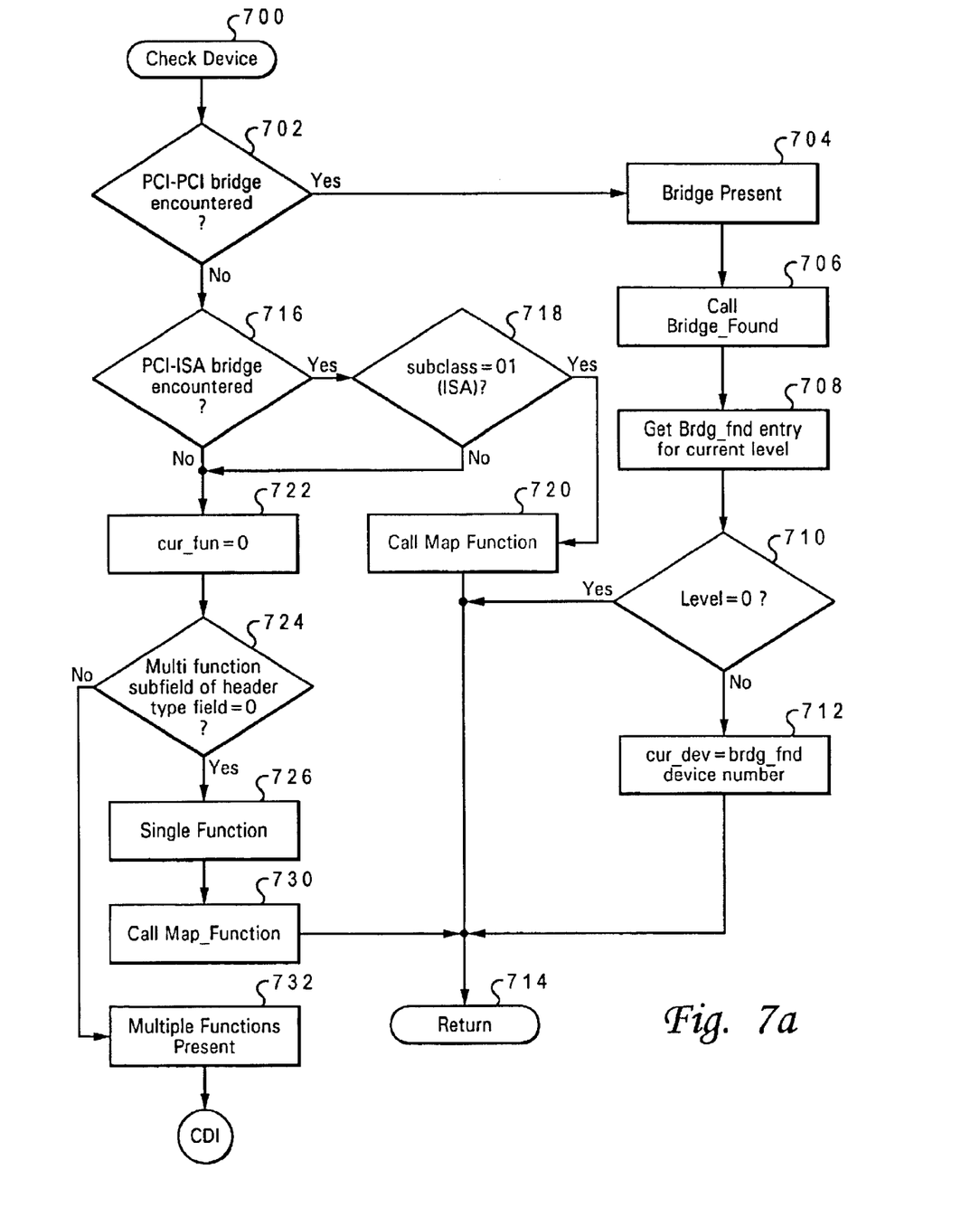

With reference now to FIG. 7a, there is illustrated a high-level logic flow diagram that illustrates the Check device routine of the docking station enclosure 24, according to a preferred embodiment of the present invention. The Check Device routine is started at step 700 to inspect the PCI channel for resident devices. As illustrated at step 702, the Layout Subfield of the Header type field is checked to determine if a bridge is present. If a bridge is present, then the process continues at step 704. Next, the process checks to see what devices are present, including other bridges in the bridge_found routine as depicted in step 706. At step 708, the level of the bridge is reestablished by accessing the brdg_fnd table using the current level as an index. Now proceeding at step 710, the level field is checked to determine if a secondary bridge exists at this level. If a secondary bridge does not exist, then the routine returns to the calling routine as shown at step 714. If a secondary bridge does exist, its level is established as the next level to interrogate as illustrated at step 712, and the routine returns to the calling routine at step 714.

Referring now to step 702, if a bridge is not present, a check is performed at step 716 to see if the PCI-ISA bridge 78 or a PCI device has been encountered. If PCI-ISA bridge has been encountered, a check is performed to determine if the device is an ISA device.

Returning now to step 716, if a PCI device is present, it is checked for multiple functions. First the current function pointer is reset to 0 (cur_fun) at step 722. Proceeding to step 724, the multifunction subfield of the header type field is checked to determine if only a single function exists. If a single function exist, the process continues as shown to step 726. Next, at step 730, the map function routine is invoked to map the physical address to the corresponding CardBus logical address as viewed at the PC Card Connector 62. The process then returns to the calling function as depicted at step 714.

Figure 7B:
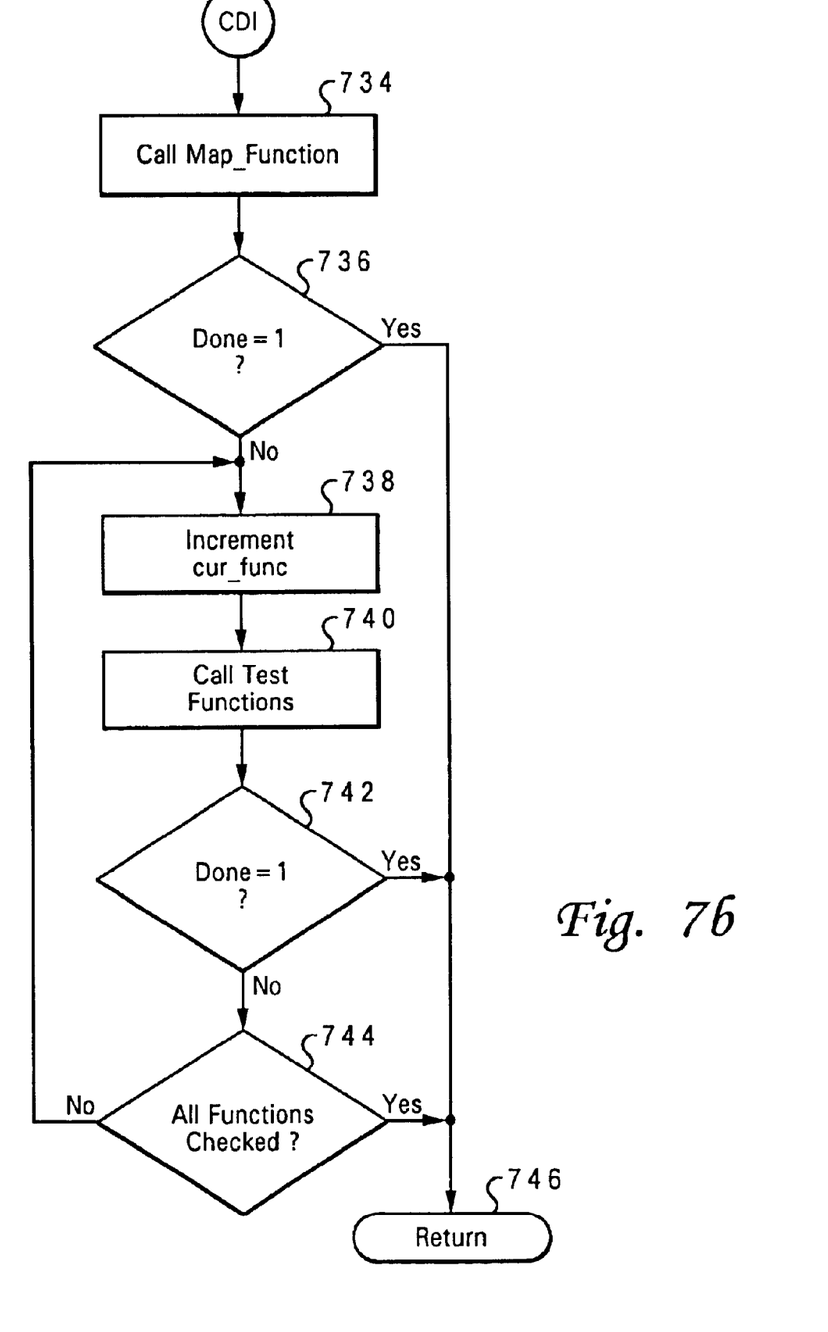

Referring back to step 724, if multiple functions exist on the device, the process continues as shown at step 732. With reference now to FIG. 7b, there is illustrated a continuation of the high-level flow chart of the Check_Device routine. The routine examines all potential function numbers to see where the other functions reside. The first function, always function number 0, is then mapped to its logical CardBus address as viewed from the PC Card Connector 62 by calling the map_function at step 734. Proceeding now to step 736, a check is performed to determined if all potential CardBus functions have been initialized. If all functions have been initialized, then the routine returns to the calling routine at step 746. If all logical functions have not been assigned, the process continues to step 738 wherein the current function assigned counter is incremented. Next at step 740, the Test Function routine is invoked to locate the additional functions and to map them to logical CardBus functions at the PC Card Connector 62. After completing the Test Function routine, a check is made at step 742 to see if all logical functions have been assigned. If all functions have been assigned, the process returns to the calling routine as shown at step 746. If all assignments have not been made, then a check is performed at step 744 to determine if all functions present on the device have been checked. If all functions have been checked interrogated, the routine returns to the calling routine at step 746, otherwise the process of interrogating each function continues once again as depicted at step 738.

Figure 8A:
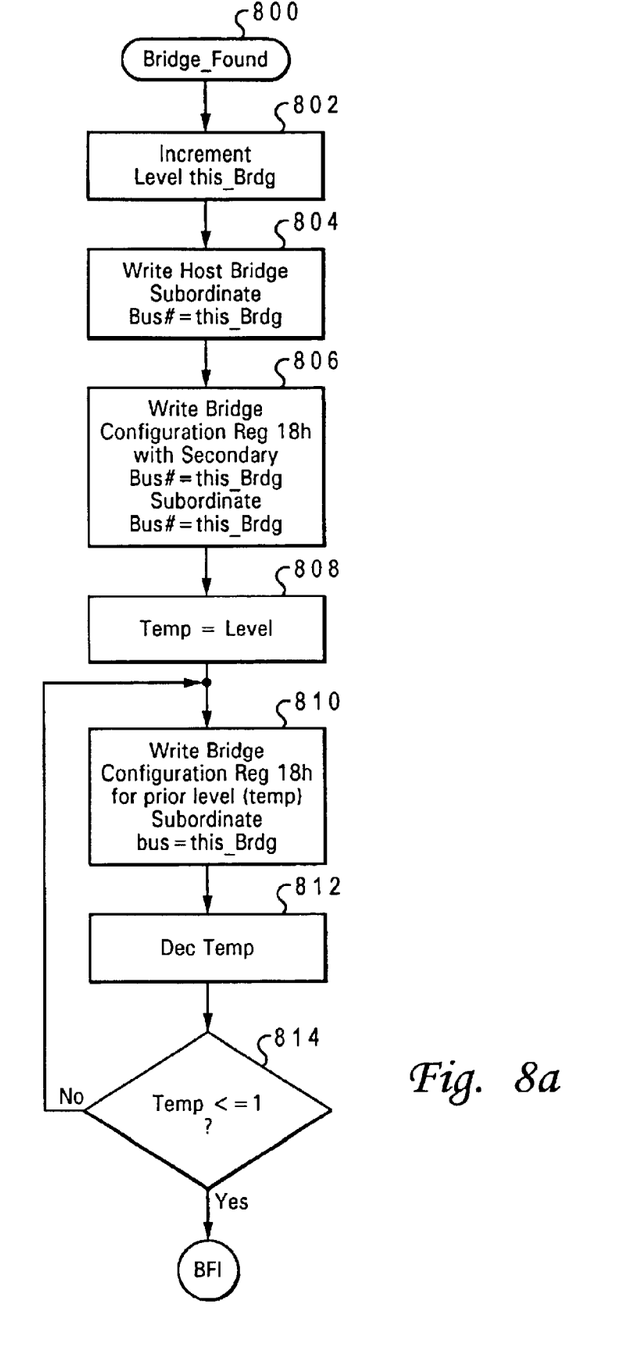

With reference now to FIG. 8a, there is depicted a high-level logic flow diagram that illustrates the Bridge_Found routine of the docking station enclosure 24, according to a preferred embodiment of the present invention. The Bridge_Found routine is started at step 800 and is utilized to find all bridges in the path to a PCI device. It is also utilized to configure the bridges intervening in the path to the device. As shown at step 802, the level and bridge counters are incremented. Next the host bridge, the first bridge on the docking station enclosure 24, subordinate bus number field is written with the number of the newly found bridge in its path to the device at step 804. As shown at step 806, the current bridge configuration secondary bus number fields are written with the bridge counter. Proceeding to step 808, a temporary counter is established with the current bridge level in order to configure the intervening bridges between the host bridge and this bridge.

Next at step 810, the subordinate bus number field is written in the current bridge configuration register. The temporary counter is then decremented to point to the level above the current level as shown at step 812. Then, at step 814, a check is made to determine if all intervening bridges have been configured. If not, the process proceeds to step 810.

Figure 8B:
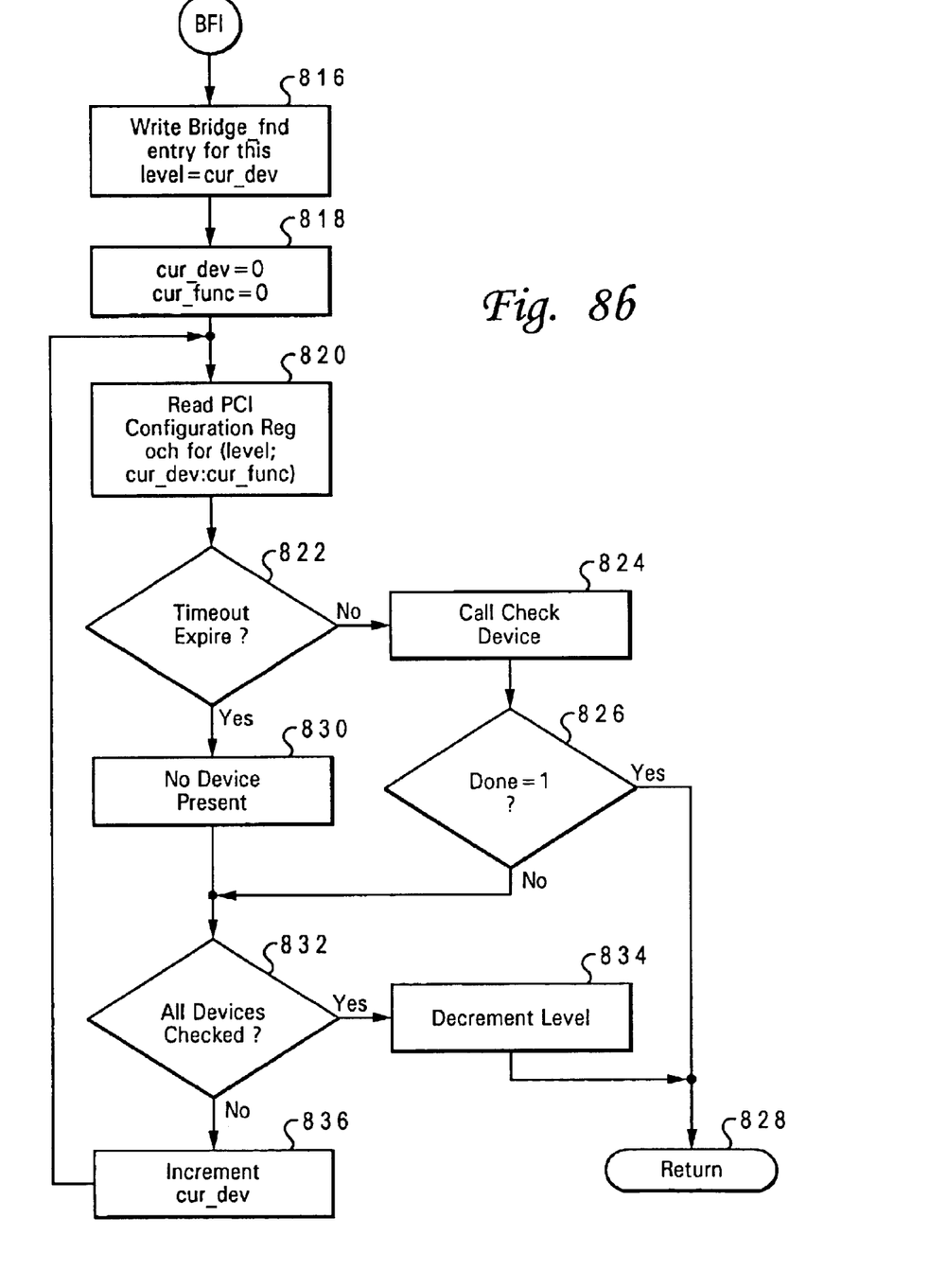

With reference now to FIG. 8b, there is illustrated a continuation of the high-level flow chart of the Bridge_Found routine. If the check made at step 814 determines that all intervening bridges are configured, then the process continues to step 816. At step 816, the value of the counter cur_dev is written in the bridge fnd table as an index for later use. Next at step 818, the current device (cur_dev) and current function (cur_func) counters are reset to zero. Proceeding next at step 820, the drive space below the current bridge is search for the presence of additional devices.

Continuing now to step 822, a check is made to determine if the read I/O operation at step 820 has timed out. If a device operation has not timed out, the Check Device routine is invoked at step 824. Upon return from the Check Device routine, a check is performed at step 826 to see if all logical CardBus functions have been assigned. If all functions have been assigned, then the process returns to the calling routine as depicted at step 828. If not all functions have been allocated, a check is performed at step 832 to see if all potential devices have been checked. If all devices have been checked, the level counter is decremented at step 834, and the process returns to the calling routine as shown at step 828. If all potential devices have not been checked, the current device counter (cur_dev) is incremented at step 836, and the process continues as illustrated at step 820.

Returning now to step 822, if the read I/O operation in step 820 does time out, then as shown at step 830, no device is present. The process then continues to step 832 to determine if all devices have been checked.

Figure 9:
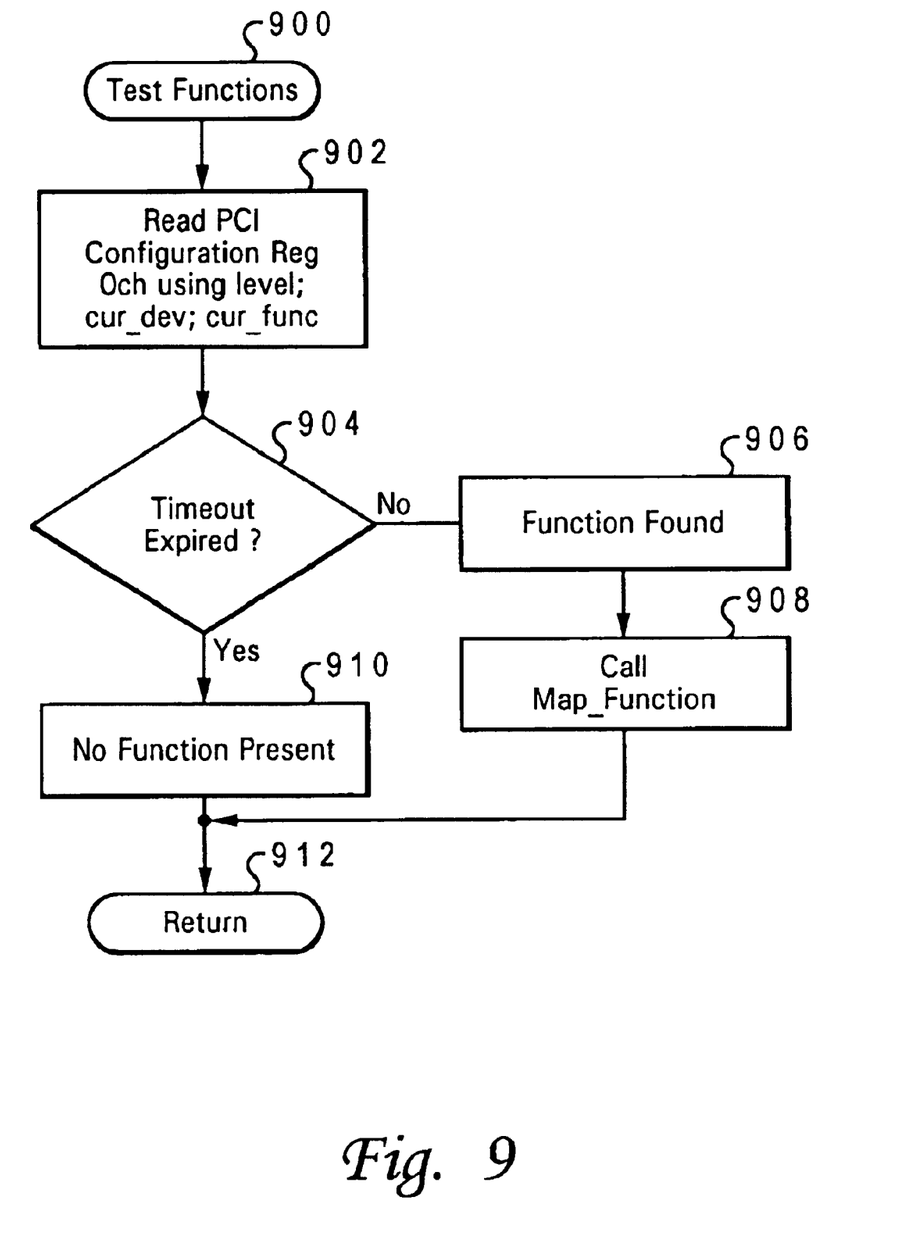

With reference now to FIG. 9, there is illustrated a high-level logic flow diagram that illustrates the Test_Functions routine of the docking station enclosure 24, according to a preferred embodiment of the present invention. The Test_Functions routine is started at step 900 and is utilized to find all functions implemented on a multiple function PCI device. At step 902, the function addressed by the current function counter (cur_func) is interrogated to see if it exists. A check is made at step 904 to see if the read function at step 902 timed out. If the read function completes successfully (no timeout), then a function has been found as shown at step 906. At step 908, the function is then mapped in the logical function space of PC Card Connector 62 by calling the Map_Function. After the function has been mapped, the process returns to the calling routine as shown at step 912. If at step 904, it is determined that a timeout did occur, then no function is present as depicted at step 910, and the process returns to the calling function as illustrated at step 912.

Figure 10:
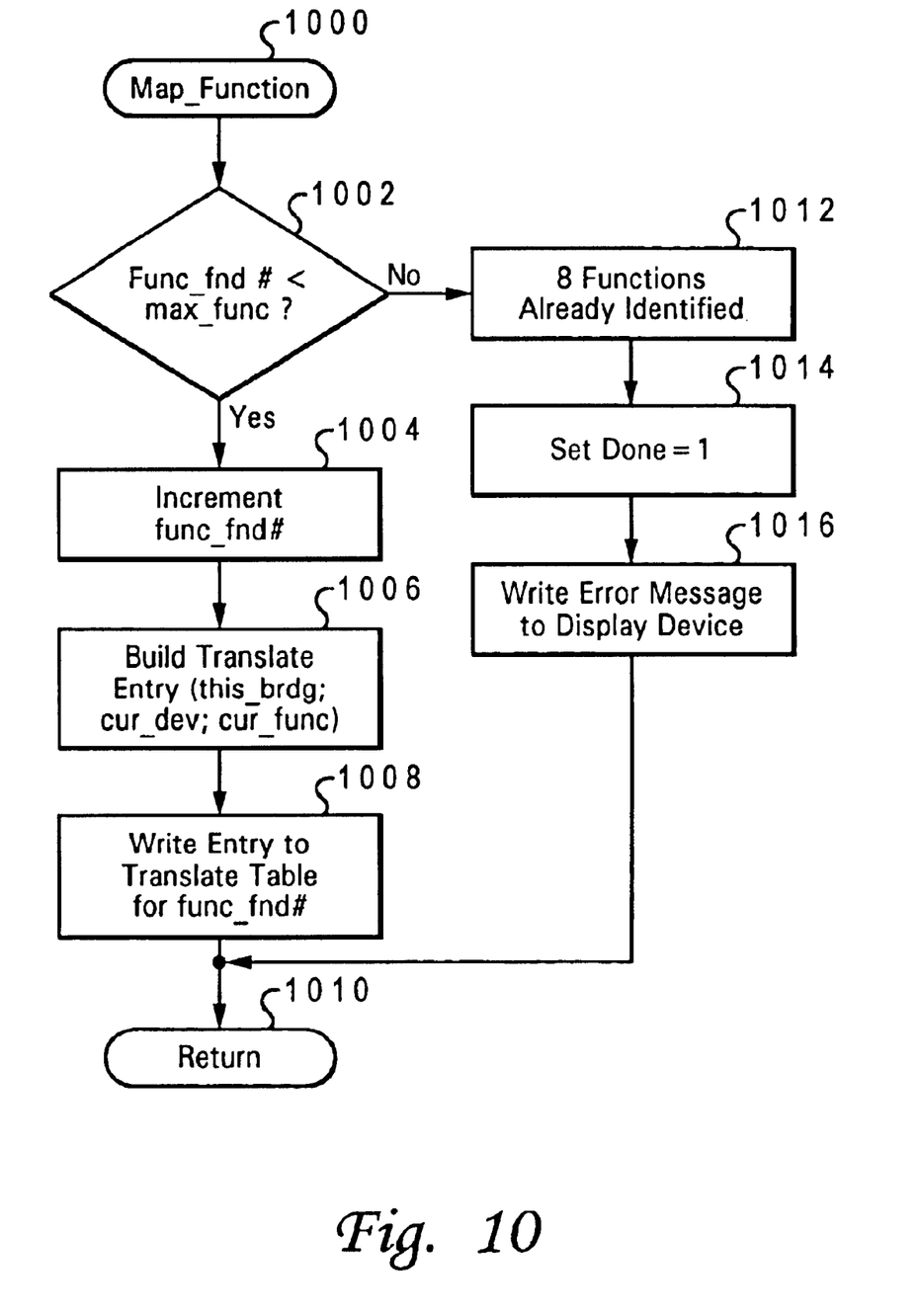

With reference now to FIG. 10, there is depicted a high-level logic flow diagram that illustrates the Map_Function routine of the docking station enclosure 24, according to a preferred embodiment of the present invention. The Map_Function routine is started at step 1000 and is utilized to allocate the logical CardBus function address to the PCI physical device and build the hardware resident translation table stored in translation table register 90. At step 1002, a check is performed to determine if the function found number counter (Func_fnc) is below the maximum number of CardBus functions allowed by the PC Card architecture. If the counter is below the maximum number, then not all of the functions were mapped, so the process continues as shown at step 1004. At step 1004, the function found number counter is incremented.

Next, as shown at step 1006, the translation table entry for this function is assembled utilizing this_brdg, current device counter, cur_div, and current function counter (cur_func). This entry is then written at step 1008 to the hardware resident table using the function found counter as an index, and the process returns to the calling routine as shown at step 1010.

Returning to step 1002, if function found number counter is not below the maximum number of CardBus functions allowed, then all functions have been allocated as illustrated at step 1012. Next at step 1014, the finished configuration flag (done) is set. As depicted at step 1016, an error message is next written to a display device indicating not all PCI devices or functions in the docking station enclosure could be configured. The process then returns to the calling routine as shown at step 1010.

Figure 11:
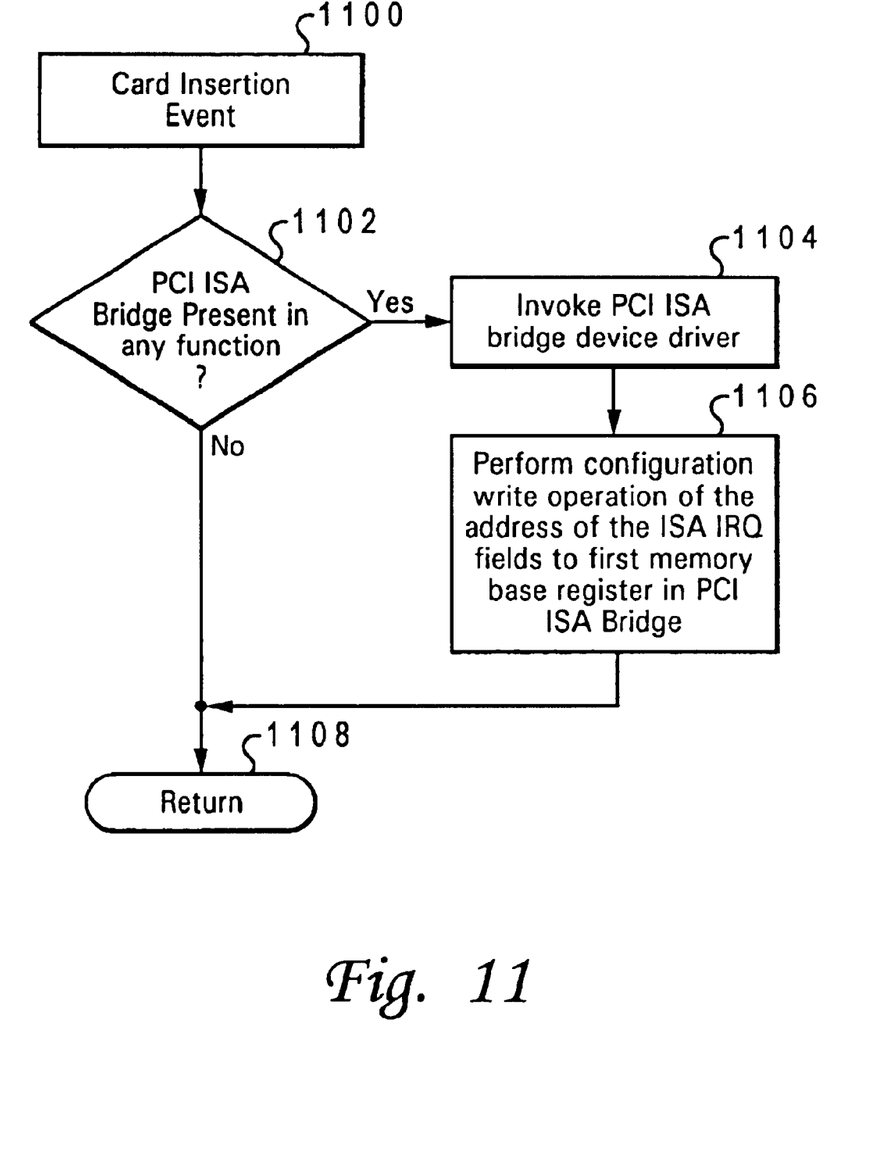
FIG. 11, depicts a high-level logic flow diagram for a PC card insertion event, according to a preferred embodiment of the present invention.

With reference now to FIG. 11, there is illustrated a high-level logic flow diagram that illustrates the Card Insertion routine of the CardBus controller 72, according to a preferred embodiment of the present invention. The Card Insertion routine is started at step 1100 when PC card connector 62 is coupled to PC card interface 20. At step 1102, a check is performed to determine if PCI-ISA bridge 78 is present in docking station enclosure 24. If PCI-ISA bridge 78 is not present, then the process returns to the calling routine as shown at step 1108. If PCI-ISA bridge 78 is found, then the PCI-ISA bridge driver is invoked as depicted at step 1104. As shown in step 1106, PCI-ISA bridge driver initializes ISA IRQ Host Memory Address Register 86 in bridge logic 80 by writing the memory address of the ISA IRQ Host Memory Register 68 to the first base address register of the PCI-ISA bridge configuration space. Bridge logic 80 will intercept the write configuration space and transfer the address to the ISA IRQ Host Memory Address Register 86. The process then returns to the calling routine as shown in step 1108.

As has been described, the present invention provides an improved docking station system and method for emulating one or more ISA adapters as PC Card functions at a PC Card interface.

In a first aspect of the present invention, control logic within the docking station enclosure receives communication signals from the computer system via the PC Card connector, converts these signals, and transmits the converted signals to ISA adapters in the docking station enclosure.

According to a second aspect of the present invention, control logic within the docking station receives communication signals from the ISA adapters in the docking station enclosure, converts the communication signals into interface signals, and then transmits the interface signals to the computer system via the PC Card connector.

In a third aspect of the present invention, additional control logic within the docking station receives interrupt signals from the ISA adapters in the docking station enclosure, converts the interrupt signals into interface signals, and transmits the interface signals to the computer system via the PC Card connector.

In an additional aspect of the present invention, interrupt control logic within the computer system receives interface signals from control logic in the docking station enclosure via the PC Card interface and initiates a system interrupt corresponding to the received signal.

Furthermore, in a forth aspect of the present invention, control logic within the docking station enclosure receives signals from the computer system via the PC Card connector and decodes converts these signals to the ISA bus standard for operating ISA adapters in the docking station enclosure.

While the invention has been particularly shown and described with reference to a preferred embodiment, it will be understood by those skilled in the art that various changes in form and detail may be made therein without departing from the spirit and scope of the invention.

What is claimed is:

1. A docking station system for use with a computer system which includes an externally accessible personal computer (PC) Card interface for transferring signals conforming to the PC card standard, said docking station comprising:

a docking station enclosure;

a PC card connector that connects to and passes interface signals between said PC Card interface of said computer system and said docking station enclosure;

an ISA bus structure mounted within said docking station enclosure conforming to the ISA bus standard;

docking station bridge logic coupled to receive said interface signals from said computer system via said PC Card connector, wherein said docking station bridge logic converts said interface signals thereon to signals for operating said ISA bus structure; and an interrupt control logic coupled to receive said interface signals from said PC Card interface, wherein said interrupt control logic converts said interface signals thereon to system interrupt requests, wherein ISA operability is supported in said docking station system.

2. A docking station system according to claim 1, further comprising:

ISA bus interrupt logic coupled to receive ISA interrupt signals via said ISA bus structure, wherein said ISA bus interrupt logic converts said ISA interrupt signals to said interface signals, wherein ISA operability is supported in said docking station system.

3. A docking station system according to claim 1, further comprising:

a PCI bus structure mounted within said docking station enclosure conforming to the PCI bus standard; wherein said docking station bridge logic converts said interface signals thereon to signals for operating said PCI bus structure, wherein PCI operability is supported in said docking station system.

4. A docking station system according to claim 1, wherein a plurality of ISA adapters are coupled to said ISA bus structure.

5. A docking station system according to claim 3, wherein a plurality of PCI adapters are coupled to said PCI bus structure.

6. A docking station system according to claim 4, wherein said plurality of ISA adapters are treated as respective PC Card functions at said PC Card interface.

7. A docking station system according to claim 5, wherein said plurality of PCI adapters are treated as respective PC Card functions at said PC Card interface.

8. A method of transforming signals in a docking station system having a computer system with an externally accessible PC Card interface coupled to a docking station enclosure, wherein said computer system communicates with said docking station enclosure utilizing a PC card connector, said method comprising the steps of:

receiving computer interface signals from said computer system via said PC card interface;

converting said computer interface signals to ISA signals for operating an ISA bus;

receiving docking station interface signals from said docking station enclosure via said PC Card interface;

converting said docking station interface signals to system interrupt signals, wherein ISA operability is supported in said docking station system.

9. The method according to claim 8, further comprising the steps of:

receiving ISA interrupt signals from said ISA bus; and converting said ISA interrupt signals to said docking station interface signals, wherein ISA operability is supported in said docking station system.

10. The method according to claim 8, further comprising the step of:

transforming said computer interface signals to PCI signals for operating a PCI bus.

11. The method according to claim 8, further comprising the step of:

receiving said ISA signals by a plurality of ISA adapters.

12. The method according to claim 9, further comprising the step of:

receiving said PCI signals by a plurality of PCI adapters.

13. The method according to claim 11, further comprising the step of:

communicating said plurality of ISA adapters by treating said plurality of ISA adapters as a respective plurality of PC Card functions at said PC Card interface.

14. The method according to claim 12, further comprising the step of:

communicating said plurality of PCI adapters by treating said plurality of PCI adapters as a respective plurality of PC Card functions at said PC Card interface.

* * * * *